(12) United States Patent
Li et al.

(10) Patent No.: US 11,130,323 B2
(45) Date of Patent: Sep. 28, 2021

(54) MOLDABLE POLYESTER SHEET MATERIALS AND RECYCLABLE BARRIER PACKAGES MADE THEREFROM

(71) Applicant: SPARTECH LLC, St. Louis, MO (US)

(72) Inventors: Jiang Li, St. Louis, MO (US); Mosongo Moukwa, Chapel Hill, NC (US); Gregory Dixon, Foristell, MO (US)

(73) Assignee: SPARTECH, LLC, St. Louis, MO (US)

( * ) Notice: Subject to any disclaimer, the term of this patent is extended or adjusted under 35 U.S.C. 154(b) by 72 days.

(21) Appl. No.: 16/483,227

(22) PCT Filed: Jan. 30, 2018

(86) PCT No.: PCT/US2018/015921
§ 371 (c)(1),
(2) Date: Aug. 2, 2019

(87) PCT Pub. No.: WO2018/144444
PCT Pub. Date: Aug. 9, 2018

(65) Prior Publication Data
US 2020/0230933 A1    Jul. 23, 2020

Related U.S. Application Data

(60) Provisional application No. 62/454,695, filed on Feb. 3, 2017.

(51) Int. Cl.
*B32B 27/30* (2006.01)
*B32B 27/36* (2006.01)
(Continued)

(52) U.S. Cl.
CPC ............. *B32B 27/36* (2013.01); *B32B 27/08* (2013.01); *B32B 27/20* (2013.01); *B65D 65/40* (2013.01);
(Continued)

(58) Field of Classification Search
CPC ......... B32B 27/08; B32B 27/20; B32B 27/36; B32B 2250/244
(Continued)

(56) References Cited

U.S. PATENT DOCUMENTS 6,083,585 A    7/2000   Cahill et al.
8,609,227 B2   12/2013  Hashimoto et al.
(Continued)

FOREIGN PATENT DOCUMENTS

CN    106313412 A    1/2017
JP    2004025876 A   1/2004
(Continued)

OTHER PUBLICATIONS

European Extended Search Report for EP 18 74 8222, dated Sep. 24, 2020, 9 pages.
(Continued)

*Primary Examiner* — Betelhem Shewareged
(74) *Attorney, Agent, or Firm* — Armstrong Teasdale LLP (57) ABSTRACT

Moldable sheet materials include a first layer including a first polyester, a second layer including a second polyester, and, optionally, a third layer including a third polyester. The first polyester, the second polyester, and the third polyester are the same as or different from each other of the first polyester, the second polyester, and the third polyester. The sheet materials exclude one or more of adhesives, ethylene vinyl alcohol, polyvinyl alcohol, polyvinylidene chloride, polyamides, polyolefins, polystyrenes, and the like. Molded packages made from the sheet materials exhibit desirable
(Continued)

A

B oxygen and water vapor barrier properties while also being suitable for recycling in a polyethylene terephthalate recycle stream.

19 Claims, 2 Drawing Sheets

(51) Int. Cl.
  *B32B 27/08* (2006.01)
  *B32B 27/20* (2006.01)
  *B65D 65/40* (2006.01)
(52) U.S. Cl.
  CPC . *B32B 2250/244* (2013.01); *B32B 2307/7244* (2013.01); *B32B 2307/7246* (2013.01); *B32B 2439/40* (2013.01)
(58) Field of Classification Search
  USPC ......................................................... 428/206
  See application file for complete search history.

(56) References Cited

U.S. PATENT DOCUMENTS

| | | | |
|---|---|---|---|
| 2005/0123779 A1* | 6/2005 | Yoshida | ................ B29C 55/023 428/480 |
| 2009/0311493 A1 | 12/2009 | Manabe et al. | |
| 2010/0272974 A1 | 10/2010 | Hashimoto et al. | |
| 2011/0305913 A1 | 12/2011 | Hinton et al. | |
| 2020/0230933 A1* | 7/2020 | Li | .......................... B65D 65/40 |

FOREIGN PATENT DOCUMENTS

| | | |
|---|---|---|
| KR | 20120061088 A | 6/2012 |
| WO | 2015182406 A1 | 12/2015 |

OTHER PUBLICATIONS

International Search Report for related application No. PCT/US2018/015921 dated Apr. 6, 2018, 5 pp.

* cited by examiner

MOLDABLE POLYESTER SHEET MATERIALS AND RECYCLABLE BARRIER PACKAGES MADE THEREFROM

CROSS-REFERENCE TO RELATED APPLICATIONS

This application is a U.S. National Phase Application of PCT/US2018/015921, filed Jan. 30, 2018, which claims priority to U.S. Patent Application Ser. No. 62/454,695 filed Feb. 3, 2017 for "MOLDABLE POLYESTER SHEET MATERIALS AND RECYCLABLE BARRIER PACKAGES MADE THEREFROM," which are both hereby incorporated by reference in their entirety.

FIELD OF THE INVENTION

This invention relates to moldable polyester sheet materials which can be molded into packages for products such as shelf-stable, frozen, or refrigerated food products. The sheet materials and the packages made from them exhibit desirable oxygen and water vapor barrier properties while also being suitable for recycling in a polyethylene terephthalate recycle stream.

BACKGROUND OF THE INVENTION

Demand exists for thermoplastic packages with barrier properties such as oxygen barrier properties and water vapor barrier properties. These barrier properties help to preserve freshness and prevent degradation or spoilage of the product enclosed in the package.

Typically, barrier properties can be provided by conventional thermoplastic multilayer structures that include one or more barrier layers made from materials such as polyvinylidene chloride (PVDC), ethylene vinyl alcohol (EVOH), polyvinyl alcohol (PVOH), polyamides (e.g., nylons), polyolefins (e.g., polyethylenes, polypropylenes, cyclic olefin copolymers, etc.), metalized polymer films, metal foils, and the like. Such multilayer structures also typically include one or more structural layers made from materials such as polystyrenes, polyethylene terephthalate, polyolefins (e.g., polyethylenes, polypropylenes, etc.), and the like. Further, because the barrier layer materials often are chemically dissimilar to the structural layer materials, these multilayer structures also typically include one or more tie layers to provide adhesion between the barrier and structural layers.

Packages formed from conventional thermoplastic multilayer structures can meet typical requirements for barrier properties for applications such as packaging for shelf-stable, frozen, or refrigerated food products. Additionally, such packages can be convenient for consumers because typically these packages are designed to be disposable.

Increasingly, however, there is demand for thermoplastic packages that are not just disposable, but also recyclable. Yet, disadvantageously, packages formed from conventional thermoplastic multilayer structures, which contain the various layers of chemically dissimilar materials as described above, cannot be readily and cost-effectively recycled in conventional post-consumer recycle streams.

The ASTM International Resin Identification Coding System provides set of designations that can be applied to plastic products to identify the type of plastic material used to make the product. Under the current set of designations, plastics made with polyethylene terephthalate (PET) are designated with "1" and/or "PET" and/or "PETE". PET, which is often used in beverage bottles, is among the most commonly recycled plastic materials.

SUMMARY OF THE INVENTION

Consequently, a need exists for moldable sheet materials which can be formed into packages that exhibit desirable oxygen and water vapor barrier properties while also being suitable for recycling in a post-consumer recycle stream, especially the polyethylene terephthalate (PET) post-consumer recycle stream.

The aforementioned needs are met by one or more aspects of the present invention.

One aspect of the invention is moldable sheet materials as described herein. The sheet materials include a first layer including a first polyester, a second layer including a second polyester, and, optionally, a third layer including a third polyester. The first polyester, the second polyester, and the third polyester are the same as or different from each other of the first polyester, the second polyester, and the third polyester. The second layer is disposed between the first layer and the third layer when the third layer is present. The sheet materials exclude one or more of adhesives, ethylene vinyl alcohol, polyvinyl alcohol, polyvinylidene chloride, polyamides, polyolefins, polystyrenes, and the like. The sheet material, when molded into a cup having a surface area, has an oxygen transmission rate equal to or less than a comparative oxygen transmission rate, and a water vapor transmission rate equal to or less than a comparative water vapor transmission rate, for a comparative cup having the same surface area and comprising about 73.1 volume percent of polystyrene (PS), about 2.4 volume percent of ethylene vinyl alcohol (EVOH), and about 7.7 volume percent of polyethylene (PE), by volume of the comparative cup.

Another aspect of the invention is a moldable sheet material. The moldable sheet material comprises a first layer consisting of polyethylene terephthalate (PET), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof. The moldable sheet material further comprises a second layer consisting of polybutylene terephthalate (PBT), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof. The moldable sheet material further comprises a third layer consisting of polyethylene terephthalate (PET), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof. The first layer, the second layer, and the third layer are coextruded and the second layer is disposed between the first layer and the third layer. A ratio of a thickness of the first layer relative to a thickness of the second layer relative to a thickness of the third layer is about 1:2:1, the sheet material excludes adhesives, ethylene vinyl alcohol, polyvinyl alcohol, polyvinylidene chloride, polyamides, polyolefins, and polystyrenes, and the sheet material, when molded into a cup having a surface area, has an oxygen transmission rate equal to or less than a comparative oxygen transmission rate, and a water vapor transmission rate equal to or less than a comparative water vapor transmission rate, for a comparative cup having the same surface area and comprising about 73.1 volume percent of polystyrene (PS), about 2.4 volume percent of ethylene vinyl alcohol (EVOH), and about 7.7 volume percent of polyethylene (PE), by volume of the comparative cup.

Another aspect of the invention is molded packages formed from sheet materials as described herein.

Yet another aspect of the invention is packaging assemblies for enclosing a product. The packaging assemblies include the molded package as described herein and a lidding film that is removably sealed to the molded package.

Molded packages made from sheet materials of the present invention exhibit desirable oxygen and water vapor barrier properties while also being suitable for recycling in a polyethylene terephthalate recycle stream.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to moldable sheet materials.

In other embodiments, the present invention is directed to molded packages formed from the sheet materials.

In further embodiments, the present invention is directed to packaging assemblies that include the molded packages.

Required and optional features of these and further embodiments of the present invention are described.

Moldable Sheet Materials

Moldable sheet materials include a first layer including a first polyester, a second layer including a second polyester, and, optionally, a third layer including a third polyester. When the optional third layer is present, the second layer is disposed between the first layer and the third layer.

Sheet materials of the present invention can comprise, consist essentially of, or consist of, the first layer, the second layer, and optionally, the third layer, as described herein.

In some embodiments, the first layer, the second layer, and, when present, the third layer, are coextruded or laminated.

In some embodiments, a ratio of a thickness of the first layer relative to a thickness of the second layer relative to a thickness of the third layer ranges from about 1:1:0 to about 1:18:1, or from about 1:1:1 to about 1:18:1. In other embodiments, the same ratio of layer thicknesses ranges from about 1:1.5:0 to about 1:3:1, or from about 1:1.5:1 to about 1:3:1. In further embodiments, the same ratio of layer thicknesses is about 1:2:1.

In some embodiments, the sheet materials have a total thickness ranging from about 7 to about 70 mils (about 0.1778 to about 1.778 mm). In other embodiments, the sheet materials have a total thickness ranging from about 14 to about 20 mils (about 0.3556 to about 0.508 mm).

According to the present invention, the sheet materials exclude one or more of conventional tie layer ingredients, for example, adhesives, and/or one or more of conventional barrier layer ingredients, for example, ethylene vinyl alcohol (EVOH), polyvinyl alcohol (PVOH), polyvinylidene chloride (PVDC), polyamides, polyolefins (e.g., polyethylenes (PE), polypropylenes (PP), cyclic olefin copolymers (COC), etc.), polystyrenes (PS) (e.g., high impact polystyrene, general purpose or crystal polystyrene, etc.), and the like. For example, in some embodiments, the sheet materials exclude all of the aforementioned conventional tie layer ingredients and/or conventional barrier layer ingredients.

Surprisingly, although the sheet materials of the present invention exclude one or more of conventional tie layer ingredients and/or conventional barrier layer ingredients, molded packages such as cups, trays, and clamshells made from the sheet materials exhibit desirable oxygen and water vapor barrier properties.

Indeed, according to the present invention, the sheet materials, when molded into a cup (or a tray or a clamshell) having a surface area, have an oxygen transmission rate (according to ISO 15105-2) equal to or less than a comparative oxygen transmission rate for a comparative cup (or tray or clamshell) having the same surface area and including about 73.1 volume percent of polystyrene (PS), about 2.4 volume percent of ethylene vinyl alcohol (EVOH), and about 7.7 volume percent of polyethylene (PE), by volume of the comparative cup. Likewise, the sheet materials, when molded into a cup (or a tray or a clamshell) having a surface area, have a water vapor transmission rate (according to ISO 15106-2) equal to or less than a comparative water vapor transmission rate for a comparative cup (or tray or clamshell) having the same surface area and including about 73.1 volume percent of polystyrene (PS), about 2.4 volume percent of ethylene vinyl alcohol (EVOH), and about 7.7 volume percent of polyethylene (PE), by volume of the comparative cup.

In some embodiments, the comparative cup is defined to have a surface area of about 42 $cm^2$ and a total thickness of about 25 mils (0.635 mm) and is molded from a sheet having a composition and structure as summarized in Table 1.

TABLE 1

| | Comparative Cup | | |
|---|---|---|---|
| | Layer | Ingredient | Vol. % |
| Top (Internal) | 1 | PS | 36.7% |
| | 2 | PE | 6.7% |
| | 3 | Tie | 1.9% |
| | 4 | EVOH | 1.1% |
| | 5 | Tie | 2.9% |
| | 6 | PE | 1.0% |
| | 7 | Tie | 2.7% |
| | 8 | EVOH | 1.3% |
| | 9 | Tie | 2.9% |

TABLE 1-continued

| | Comparative Cup | | |
|---|---|---|---|
| | Layer | Ingredient | Vol. % |
| | 10 | PS | 36.4% |
| | 11 | Tie | 2.0% |
| | 12 | Tie | 0.8% |
| Bottom (External) | 13 | PET(G) | 3.6% |
| Total | — | — | 100% |

Further, in preferred embodiments, the sheet materials, when molded into a cup (or a tray or a clamshell) having a surface area, for example, about 42 cm$^2$, have an oxygen transmission rate that is lower than a comparative oxygen transmission rate, and a water vapor transmission rate that is lower than a comparative water vapor transmission rate, for a comparative cup (or tray or clamshell) having the same surface area and including about 73.1 volume percent of polystyrene (PS), about 2.4 volume percent of ethylene vinyl alcohol (EVOH), and about 7.7 volume percent of polyethylene (PE), by volume of the comparative cup, for example, the comparative cup of Table 1.

In preferred embodiments, the sheet materials include a first layer including polyethylene terephthalate (PET), a second layer including polybutylene terephthalate (PBT), and a third layer including polyethylene terephthalate (PET). The first layer, the second layer, and the third layer are coextruded and the second layer is disposed between the first layer and the third layer. A ratio of a thickness of the first layer relative to a thickness of the second layer relative to a thickness of the third layer is about 1:2:1. Each layer also optionally includes one or more additional ingredients selected from antioxidants, anti-fogging agents, colorants, foaming agents, inorganic filler, oxygen scavengers, regrind of the sheet material, ultraviolet light blocking agents, and combinations thereof. Additionally, the sheet materials exclude adhesives, ethylene vinyl alcohol, polyvinyl alcohol, polyvinylidene chloride, polyamides, polyolefins, polystyrenes, and the like.

For example, in preferred embodiments, the sheet materials, when molded into a cup having a surface area of about 42 cm$^2$, have an oxygen transmission rate according to ISO 15105-2 of less than 0.601 cc/pkg/day, and a water vapor transmission rate according to ISO 15106-2 of less than 0.0273 g/pkg/day.

Polyesters

According to the present invention, the first layer includes a first polyester, the second layer includes a second polyester, and, when present, the third layer includes a third polyester.

The first polyester, the second polyester, and the third polyester are the same as or different from each other of the first polyester, the second polyester, and the third polyester.

Figure 2:
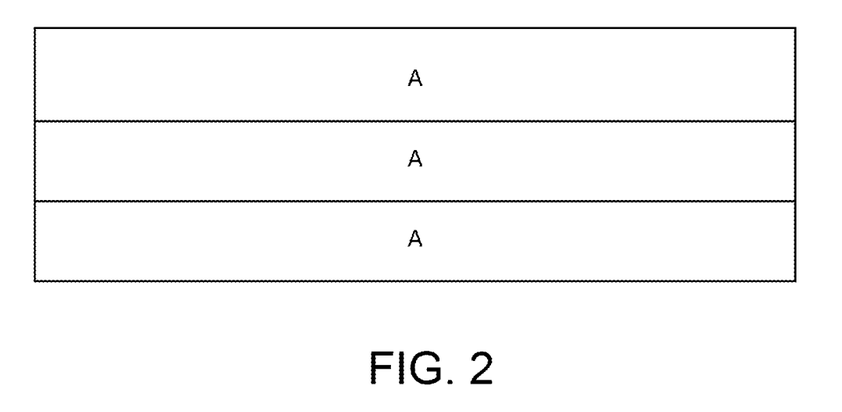
FIG. 2 is a second embodiment of a moldable sheet material having a layer composition and structure of A/A/A.

In some embodiments, for example, the first polyester is same as the second polyester (i.e., A/A layers), and, when it is present, same as the third polyester (i.e., A/A/A layers), as shown in FIG. 2.

Figure 1:
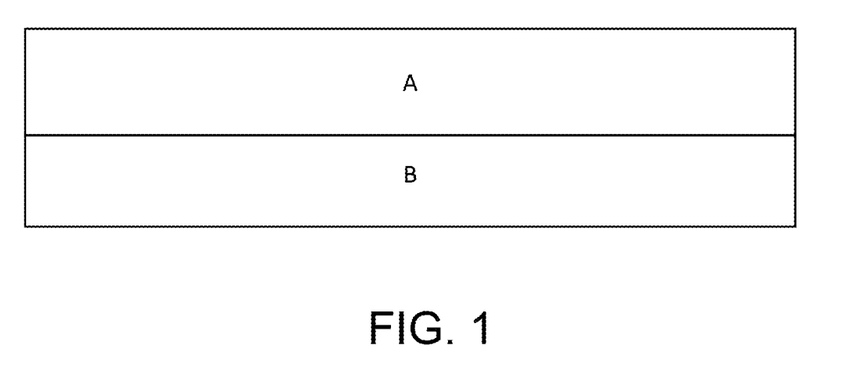
FIG. 1 is a first embodiment of a moldable sheet material having a layer composition and structure of A/B.
Figure 3:
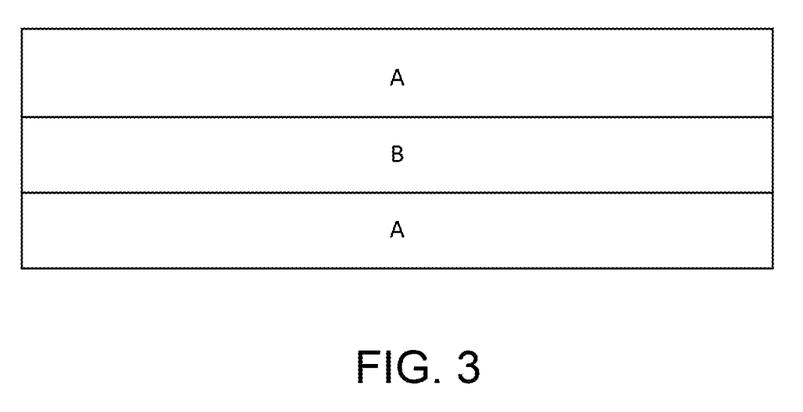
FIG. 3 is a third embodiment of a moldable sheet material having a layer composition and structure of A/B/A.
Figure 4:
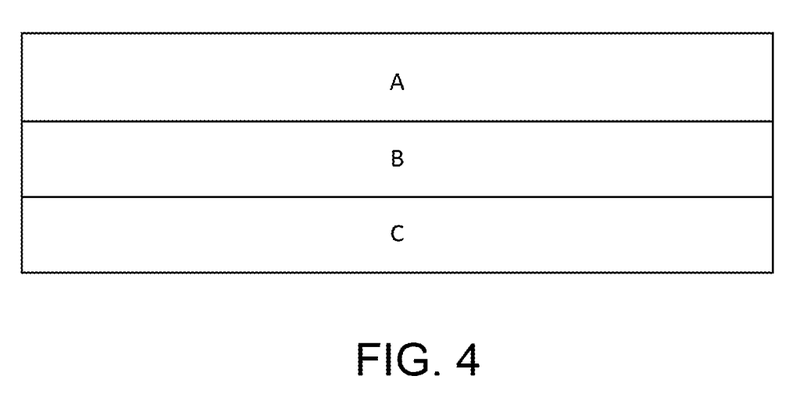
FIG. 4 is a fourth embodiment of a moldable sheet material having a layer composition and structure of A/B/C.

In other embodiments, for example, the first polyester is different from the second polyester (i.e., A/B layers), as shown in FIG. 1. In such embodiments, when the third polyester is present, the third polyester is the same as the first polyester (i.e., A/B/A layers), as shown in FIG. 3, or different from each of the first polyester and the second polyester (i.e., A/B/C layers), as shown in FIG. 4.

It is also contemplated that, in some embodiments, moldable sheet materials include one or more additional layers beyond two or three layers (e.g., 4, 5, 6, 7, 8, 9, etc.) each including an additional polyester and arranged in any suitable layer configuration provided that the resulting moldable sheet materials maintain the desirable barrier properties and remain suitable for recycling in a polyethylene terephthalate recycle stream.

Non-limiting examples of polyesters suitable for use as any of the first polyester, the second polyester, and, when present, the third polyester (as well as any additional polyester included in any additional layer) include polyethylene terephthalate (PET), polybutylene terephthalate (PBT), polyethylene napthhalate (PEN), polyethylene furanoate (PEF), and blends of two or more thereof.

In some embodiments, the first polyester is polyethylene terephthalate (PET).

In some embodiments, the second polyester is polybutylene terephthalate (PBT).

In some embodiments, the third layer is present and the third polyester is same as the first polyester. For example, in some embodiments, the third polyester is polyethylene terephthalate (PET).

In some embodiments, the polyethylene terephthalate (PET) is a homopolymer or a copolymer of polyethylene terephthalate.

In some embodiments, suitable polyethylene terephthalate (PET) has at least one of the following properties: a density according to ISO 1183 of about 1.35 g/cm$^3$; a melting point according to ISO 3146 of about 242° C.; and an intrinsic viscosity according to ISO 1628 ranging from about 0.60 to about 1.40 dL/g, or from about 0.82 to about 0.86 dL/g.

For example, in some embodiments, suitable PET has all of the aforementioned properties.

Commercially available examples of suitable PET include LASER+ 7000 (B92A), LASER+ C 9921 (F65A), and LASER+ C (C60A) grades of polyethylene terephthalate resin from DAK Americas.

In some embodiments, suitable polybutylene terephthalate (PBT) has at least one of the following properties: a density according to ISO 1183 of about 1.30 g/cm$^3$; a melting point according to ISO 3146 of about 223° C.; an intrinsic viscosity according to ISO 1628 of about 1.6 dL/g; and a melt volume rate (250° C./2.16 kg) according to ISO 1133 of about 9.5 cc/10 min.

For example, in some embodiments, suitable PBT has all of the aforementioned properties.

In further embodiments, polybutylene terephthalate (PBT) that is especially suitable has an oxygen transmission rate according to ISO 15105-2 that is about half of that of PET and a water vapor transmission rate according to ISO 15106-2 that is about half of that of PET.

Commercially available examples of suitable PBT include ULTRADUR B 6550 LN grade of polybutylene terephthalate resin from BASF.

In some embodiments, suitable polyethylene napthhalate (PEN) has at least one of the following properties: a density according to ISO 1183 of about 1.33 g/cm$^3$; a melting point according to ISO 3146 of about 265° C.; an intrinsic viscosity according to ISO 1628 from about 0.50 to about 0.68 dL/g; and a melt volume rate (300° C./1.2 kgf) according to ISO 1133 of from 5 to 18 g/10 min.

For example, in some embodiments, suitable PEN has all of the aforementioned properties.

In further embodiments, polyethylene napthhalate (PEN) that is especially suitable has an oxygen transmission rate according to ISO 15105-2 that is about one-third of that of PET and a water vapor transmission rate according to ISO 15106-2 that is about one-fourth of that of PET.

Commercially available examples of suitable PEN include TECONEX TN-8050SC or TN-8065S grades of polyethylene napththalate from Teijin.

Suitable polyesters include virgin polyesters, regrind of polyesters, and/or post-consumer recycled polyesters.

Additional Ingredients

In some embodiments, at least one of the first layer, the second layer, and, when present, the third layer, further includes one or more additional ingredients that are added (e.g., melt-mixed, compounded, extruded, etc.) with the polyester.

Non-limiting examples of suitable additional ingredients are antioxidants, anti-fogging agents, colorants, foaming agents, inorganic filler, oxygen scavengers, regrind of the sheet materials, ultraviolet light blocking agents, and combinations thereof.

Suitable plastics additives can be selected without undue experimentation but with reference to such treatises as *Plastics Additives Database* (2004) from Plastics Design Library (elsevier.com).

In some embodiments, additional ingredients include regrind. Regrind refers to recycled portions of sheet materials of the present invention that remain as scrap or waste after various manufacturing process steps (e.g., extrusion, forming, filling, sealing, etc.) involving the sheet materials. It is also contemplated that regrind can include recycled portions of lidding film (e.g., metalized polymer film) that remain as scrap or waste after various manufacturing process steps (e.g., sealing, etc.) involving the lidding film that is used to seal a molded packaged formed from the sheet materials to provide a packaging assembly (as further described herein below).

Ranges of Ingredients in Layers

Each layer, independent of each other layer, can comprise, consist essentially of, or consist of, the polyester, and, optionally, one or more additional ingredients as described herein.

In some embodiments, a layer, independent of each other layer, includes 100 weight percent of the polyester, by weight of the layer.

In other embodiments, a layer, independent of each other layer, includes from about 50 to about 99.9 weight percent of the polyester and from about 0.1 to about 50 weight percent of one or more of the additional ingredients, by weight of the layer.

In further embodiments, a layer, independent of each other layer, includes from about 70 to about 99 weight percent of the polyester and from about 1 to about 30 weight percent of one or more of the additional ingredients, by weight of the layer.

In even further embodiments, a layer, independent of each other layer, includes from about 85 to about 97.5 weight percent of the polyester and from about 2.5 to about 15 weight percent of one or more of the additional ingredients, by weight of the layer.

Any number between the ends of the ranges is also contemplated as an end of a range, such that all possible combinations are contemplated within the possibilities of embodiments of the present invention. Unless expressly stated otherwise herein, any disclosed number is intended to refer to exactly the disclosed number, "about" the disclosed number, or both exactly the disclosed number and "about" the disclosed number.

Molded Packages

In some embodiments, the present invention is directed to molded packages formed from the moldable sheet materials as described herein.

It is contemplated that molded packages formed from the moldable sheet materials can comprise, consist essentially of, or consist of, the moldable sheet materials.

In some embodiments, the molded packages are thermoformed or vacuum formed.

It is also contemplated that molded packages based on the principles of the present invention can be formed by processes such as blow molding, injection molding, and the like, which do not involve extruding moldable sheet materials in the form of sheet or rollstock that is subsequently subjected to a forming process such as thermoforming, vacuum forming, and the like.

In some embodiments, the molded package is rigid or semi-rigid. For example, in some embodiments, the molded package is in a form of a cup, a tray, or clamshell.

In some embodiments, molded packages are transparent (i.e., clear) or substantially transparent and exclude any colorant. For example, in some embodiments, molded packages have a light transmittance (ASTM D1746) of 90% or greater and/or a haze (ASTM D1003) of 10% or less. In other embodiments, molded packages are translucent or semi-transparent and optionally include at least some colorant in one or more layers of the moldable sheet material. In further embodiments, molded packages are opaque or substantially opaque and include at least some colorant in one or more layers of the moldable sheet material.

In some embodiments, the molded package has a surface area of about 42 $cm^2$ and an oxygen transmission rate according to ISO 15105-2 of less than 0.601 cc/pkg/day, and a water vapor transmission rate according to ISO 15106-2 of less than 0.0273 g/pkg/day.

In some embodiments, the molded package is suitable for recycling in a polyethylene terephthalate recycle stream for post-consumer waste. For example, the molded package is suitable for recycling in a post-consumer recycle stream for plastics designated "1" and/or "PET" and/or "PETE" according to the ASTM International Resin Identification Coding System.

Packaging Assemblies

In some embodiments, the present invention is directed to packaging assemblies that include the molded packages as described herein.

Packaging assemblies include the molded package formed to have an opening for receiving a product, and lidding film (e.g., metalized PET). The lidding film is removably sealed to the molded package over the opening, which encloses the product within the packaging assembly.

In some embodiments, the packaging assemblies are provided by a form fill seal (FFS) process.

Processing

The preparation of moldable sheet materials of the present invention is uncomplicated once the suitable ingredients have been selected as described herein. The moldable sheet materials can be made in batch or continuous operations.

Mixing in a continuous process typically occurs in an extruder that is elevated to a temperature that is sufficient to melt the polyester matrix with addition of any additional ingredients at the feed-throat, or by injection or side-feeders downstream.

Moldable sheet materials of the present invention can be provided by a coextrusion process in which a plurality of extruders are connected to a feed block that includes a die for extruding multiple layers at once. For example, two to nine extruders can be used, and the feed block connected to the extruders can have a die for extruding, for example, from 2 to 13 layers at once.

Other coextruding techniques also can be used. For example, a multi-manifold die may be used instead of a feed block.

It is also contemplated that groups of multiple layers can be separately coextruded and then laminated together to provide moldable sheet materials of the present invention.

Generally, after a coextrusion and/or lamination process, moldable sheet materials of the present invention are in the form of sheet or rollstock that can be used for further processing, such as molding or forming.

Examples of possible molding or forming processes include thermoforming, vacuum forming, and the like.

Other examples of possible molding or forming processes include blow molding, injection molding, and the like, which do not involve extruding sheet or rollstock that is subsequently subjected to a forming process such as thermoforming, vacuum forming, and the like.

Examples of further processing that can occur after molding or forming include filling the molded packages with product and/or sealing the filled packages with a lid.

Each of these further processes can occur by distinct processes. Alternatively, each of these further processes can occur together as part of a single process, for example, by a form fill seal (FFS) process.

Usefulness of the Invention

Packaging assemblies and/or molded packages made from sheet materials of the present invention can be used to package any conceivable product that can benefit from the desirable oxygen and water vapor barrier properties provided by the molded packages.

The important functionality of desirable oxygen and water vapor barrier properties is coupled with the added benefit (e.g., to manufacturers, consumers, and/or the environment) of recyclability of the molded packages. For example, the molded packages are suitable for recycling into a post-consumer recycle stream for plastics designated "1" and/or "PET" and/or "PETE" according to the ASTM International Resin Identification Coding System.

Packaging assemblies and/or molded packages of the present invention can be used for packaging a variety of products, for example, food products or non-food products, shelf-stable products or non-shelf stable products, refrigerated products, or frozen products. In some embodiments, the molded packages and/or packaging assemblies of the present invention can be used to package products, for example, in individual sizes, such as individual serving sizes, individual dosage sizes, or individual application sizes.

Because sheet materials of the present invention can be made into molded packages that exhibit desirable oxygen and water vapor barrier properties while also being suitable for recycling in a polyethylene terephthalate recycle stream, the molded packages are especially useful for packaging food products, such as shelf-stable food products, refrigerated food products, and frozen food products, for individual use or consumption by a consumer.

Non-limiting examples of food or snack products include milk, cream, dairy creamer, yogurt, pudding, applesauce, fruit salad, gelatin products, ice cream, cheese snacks, peanut butter, salsa, hummus, guacamole, ketchup, mustard, barbeque sauce, mayonnaise, tartar sauce, other dips, spreads, sauces, condiments, and the like.

Food or snack products are not limited to food or snack products for humans, but also can include food or snack products for non-human animals, such as pet food or pet nutrition or other animal nutrition products.

Non-limiting examples of non-food products include medical products and pharmaceuticals as well as consumer and/or professional products for health care, personal care, beauty care, household care, laundry care, baby care, lawn and garden care, pest control, building and construction, home improvement, automotive care, novelty and entertainment, and the like.

Without undue experimentation, those skilled in the art can utilize the written description of the present invention to prepare moldable sheet materials and molded packages made from them that exhibit desirable barrier properties while also being suitable for recycling in a polyethylene terephthalate recycle stream.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A moldable sheet material comprising:
a first layer comprising a first polyester; and
a second layer comprising a second polyester, wherein the second polyester is same as or different from the first polyester; and
optionally, a third layer comprising a third polyester, wherein the third polyester is same as or different from each of the first polyester and the second polyester, and wherein the second layer is disposed between the first layer and the third layer when the third layer is present;
wherein the sheet material excludes one or more of adhesives, ethylene vinyl alcohol, polyvinyl alcohol, polyvinylidene chloride, polyamides, polyolefins, and polystyrenes;
wherein the sheet material, when molded into a cup having a surface area, has an oxygen transmission rate equal to or less than a comparative oxygen transmission rate, and a water vapor transmission rate equal to or less than a comparative water vapor transmission rate, for a comparative cup having the same surface area and comprising about 73.1 volume percent of polystyrene (PS), about 2.4 volume percent of ethylene vinyl alcohol (EVOH), and about 7.7 volume percent of polyethylene (PE), by volume of the comparative cup; and
wherein at least one of the first, second, and third polyesters is polyethylene napththalate (PEN) having at least one of:
a density according to ISO 1183 of about 1.33 g/cm$^3$;
a melting point according to ISO 3146 of about 265° C.;
an intrinsic viscosity according to ISO 1628 from about 0.50 to about 0.68 dL/g; and
a melt volume rate (300° C./1.2 kgf) according to ISO 1133 of from 5 to 18 g/10 min.

2. The sheet material of claim 1, wherein the first polyester is selected from the group consisting of polyethylene terephthalate (PET), polybutylene terephthalate (PBT), polyethylene naphthalate (PEN), polyethylene furanoate (PEF), and blends of two or more thereof.

3. The sheet material of claim 1, wherein the first polyester is polyethylene terephthalate (PET).

4. The sheet material of claim 1, wherein the second polyester is selected from the group consisting of polyethylene terephthalate (PET), polybutylene terephthalate (PBT), polyethylene naphthalate (PEN), polyethylene furanoate (PEF), and blends of two or more thereof.

5. The sheet material of claim 1, wherein the third layer is present and the third polyester is selected from the group consisting of polyethylene terephthalate (PET), polybutylene terephthalate (PBT), polyethylene naphthalate (PEN), polyethylene furanoate (PEF), and blends of two or more thereof.

6. The sheet material of claim 1, wherein the third layer is present and the third polyester is same as the first polyester.

7. The sheet material of claim 1, wherein the third layer is present and the third polyester is polyethylene terephthalate (PET).

8. The sheet material of claim 7, wherein the polyethylene terephthalate (PET) is a homopolymer or a copolymer of polyethylene terephthalate.

9. The sheet material of claim 7, wherein the polyethylene terephthalate (PET) has at least one of:
   a density according to ISO 1183 of about 1.35 g/cm$^3$;
   a melting point according to ISO 3146 of about 242° C.; and
   an intrinsic viscosity according to ISO 1628 ranging from about 0.60 to about 1.40 dL/g, or from about 0.82 to about 0.86 dL/g.

10. The sheet material of claim 1, wherein at least one of the first, second, and third polyesters is polybutylene terephthalate (PBT) having at least one of:
   a density according to ISO 1183 of about 1.30 g/cm$^3$;
   a melting point according to ISO 3146 of about 223° C.;
   an intrinsic viscosity according to ISO 1628 of about 1.6 dL/g; and
   a melt volume rate (250° C./2.16 kg) according to ISO 1133 of about 9.5 cc/10 min.

11. The sheet material of claim 1, wherein at least one of the first layer, the second layer, and, when present, the third layer, further comprises one or more additional ingredients selected from the group consisting of antioxidants, anti-fogging agents, colorants, foaming agents, inorganic filler, oxygen scavengers, regrind comprising the sheet material, ultraviolet light blocking agents, and combinations thereof.

12. The sheet material of claim 1, wherein the first layer, the second layer, and, when present, the third layer, are coextruded or laminated.

13. The sheet material of claim 1, wherein a ratio of a thickness of the first layer relative to a thickness of the second layer relative to a thickness of the third layer ranges from about 1:1:1 to about 1:18:1, or from about 1:1.5:1 to about 1:3:1.

14. A moldable sheet material comprising:
   a first layer consisting of polyethylene terephthalate (PET), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof;
   a second layer consisting of polybutylene terephthalate (PBT), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof; and
   a third layer consisting of polyethylene terephthalate (PET), and, optionally, one or more additional ingredients selected from the group consisting of antioxidants, anti-fogging agents, colorants, foaming agents, inorganic filler, oxygen scavengers, regrind of the sheet material, ultraviolet light blocking agents, and combinations thereof;
   wherein the first layer, the second layer, and the third layer are coextruded and the second layer is disposed between the first layer and the third layer;
   wherein a ratio of a thickness of the first layer relative to a thickness of the second layer relative to a thickness of the third layer is about 1:2:1;
   wherein the sheet material excludes adhesives, ethylene vinyl alcohol, polyvinyl alcohol, polyvinylidene chloride, polyamides, polyolefins, and polystyrenes; and
   wherein the sheet material, when molded into a cup having a surface area, has an oxygen transmission rate equal to or less than a comparative oxygen transmission rate, and a water vapor transmission rate equal to or less than a comparative water vapor transmission rate, for a comparative cup having the same surface area and comprising about 73.1 volume percent of polystyrene (PS), about 2.4 volume percent of ethylene vinyl alcohol (EVOH), and about 7.7 volume percent of polyethylene (PE), by volume of the comparative cup.

15. The sheet material of claim 14, wherein the sheet material has a thickness ranging from about 7 to about 70 mils (about 0.1778 to about 1.778 mm), or from about 14 to about 20 mils (about 0.3556 to about 0.508 mm).

16. A molded package formed from the sheet material of claim 14.

17. The molded package of claim 16, wherein the molded package has a surface area of about 42 cm$^2$ and an oxygen transmission rate according to ISO 15105-2 of less than 0.601 cc/pkg/day, and a water vapor transmission rate according to ISO 15106-2 of less than 0.0273 g/pkg/day.

18. A packaging assembly for enclosing a product, the packaging assembly comprising:
   the molded package of claim 16, wherein the molded package is formed to have an opening for receiving the product; and
   a lidding film, wherein the lidding film is removably sealed to the molded package over the opening, thereby enclosing the product within the packaging assembly.

19. A moldable sheet material comprising:
   a first layer comprising a first polyester; and
   a second layer comprising a second polyester, wherein the second polyester is same as or different from the first polyester, and wherein the second polyester is polybutylene terephthalate (PBT); and
   optionally, a third layer comprising a third polyester, wherein the third polyester is same as or different from each of the first polyester and the second polyester, and wherein the second layer is disposed between the first layer and the third layer when the third layer is present;
   wherein the sheet material excludes one or more of adhesives, ethylene vinyl alcohol, polyvinyl alcohol, polyvinylidene chloride, polyamides, polyolefins, and polystyrenes; and
   wherein the sheet material, when molded into a cup having a surface area, has an oxygen transmission rate equal to or less than a comparative oxygen transmission rate, and a water vapor transmission rate equal to or less than a comparative water vapor transmission rate, for a comparative cup having the same surface area and comprising about 73.1 volume percent of polystyrene (PS), about 2.4 volume percent of ethylene vinyl alcohol (EVOH), and about 7.7 volume percent of polyethylene (PE), by volume of the comparative cup.

* * * * *